United States Patent
Zwickl et al.

(10) Patent No.: US 9,429,932 B2
(45) Date of Patent: Aug. 30, 2016

(54) METHOD AND COMPUTER SYSTEM FOR CHARACTERIZING A SHEET METAL PART

(75) Inventors: Titus Zwickl, Wadenswil (CH); Dimitris Servis, Zurich (CH)

(73) Assignee: AUTOFORM ENGINEERING GMBH, Wilen SZ (CH)

( * ) Notice: Subject to any disclaimer, the term of this patent is extended or adjusted under 35 U.S.C. 154(b) by 1121 days.

(21) Appl. No.: 13/454,190

(22) Filed: Apr. 24, 2012

(65) Prior Publication Data

US 2012/0283861 A1    Nov. 8, 2012

(30) Foreign Application Priority Data

May 2, 2011    (EP) .................................... 11405251

(51) Int. Cl.
*G06F 7/66* (2006.01)
*G05B 19/404* (2006.01)
*G05B 19/418* (2006.01)

(52) U.S. Cl.
CPC ....... *G05B 19/404* (2013.01); *G05B 19/41875* (2013.01); *G05B 19/41885* (2013.01); *G05B 2219/36284* (2013.01); *G05B 2219/37576* (2013.01); *G05B 2219/45137* (2013.01)

(58) Field of Classification Search
CPC .................. G05B 19/404; G05B 2219/36284; G05B 2219/45137; G05B 2219/37576
USPC .......... 700/97, 122, 127, 159, 167, 174, 180
See application file for complete search history.

(56) References Cited

U.S. PATENT DOCUMENTS

| | | | |
|---|---|---|---|
| 6,256,595 B1 * | 7/2001 | Schwalb et al. ................... | 703/1 |
| 6,490,498 B1 * | 12/2002 | Takagi ............. | G05B 19/40937 700/118 |
| 7,130,708 B2 | 10/2006 | Wang et al. | |
| 2002/0186007 A1 | 12/2002 | Cao et al. | |
| 2008/0245778 A1 * | 10/2008 | D'Angelo et al. ....... | 219/121.64 |

* cited by examiner

*Primary Examiner* — Sean Shechtman
*Assistant Examiner* — Chad Rapp
(74) *Attorney, Agent, or Firm* — Rankin, Hill & Clark LLP

(57) ABSTRACT

A method for the characterization of a sheet metal forming product uses the correlation of material flow data to a priori calculated or measured data. It determines whether the product falls within the acceptable production limits in terms of quality, areas of potential defects and an approximation of the process parameters prevailing during its production. The characterization is performed in real-time during production, tool deployment or try-out. The method includes the steps of:

providing physical dimensions of an actual sheet metal part; a feature extractor computing, from these physical dimensions, a measured material flow metric representative of the geometry of the part after the forming operation; and a matching unit determining, from reference data and the measured material flow metric, a matching forming operation data set whose associated simulated material flow metric most closely matches the measured material flow metric.

14 Claims, 3 Drawing Sheets

METHOD AND COMPUTER SYSTEM FOR CHARACTERIZING A SHEET METAL PART

FIELD OF THE INVENTION

The invention relates to the field of forming processes, in particular to the forming of sheet metal. It relates to a method capable of characterizing a sheet metal part in terms of process parameters and state variables, as well as a method for generating reference data from a set of computer simulations for characterizing a sheet metal part, as described in the preamble of the corresponding independent claims. The said method can be used in tool tryout support and quality control.

BACKGROUND OF THE INVENTION

Historically, in sheet metal forming processes a set of shaped tools, such as a die and a punch, are used to deform sheets of metal to three-dimensional metal parts. This is accomplished by stamping the desired geometry and inducing sufficient in-plane strain for final product strength and stability. FIG. 1 schematically shows, in the left half, a top view of a sheet metal blank 1 placed between forming tools, schematically represented by a punch 2. After pressure is exerted by the punch 2 in order to deform the blank 1, it takes the shape of a formed part 3, shown in the right half of FIG. 1. The tools are tailored and process parameters adjusted using empirical rules and trial and error through a series of physical tryouts. They are then deployed to the actual production line where unfortunately their performance cannot be guaranteed as measurements are difficult or impossible and the forming process is usually poorly monitored.

The forming process design phase is today assisted by numerical simulations. These numerical simulations are performed on digital computers and usually employ the well-established finite element method. The simulation computer programs, given as input a set of parameters such as the tool geometry and the process parameters, produce a description of the geometry of a sheet metal part after the forming process as well as the distribution of state variables, such as thicknesses, strains and stresses. More recently, instead of empirically setting initial values to those parameters and using heuristic or optimization methods to achieve the desirable characteristics, engineers use stochastic simulations. Instead of performing a single finite element simulation using fixed parameters, random variables with appropriate intervals are defined, and a multitude of finite element simulations are performed using different parameter sets as described, e.g., in EP 1 623 287. Through such computer aided engineering techniques, tool geometries and process parameters are established that ideally will produce the desired part.

Inevitably, due to common cause (non-assignable, noise) and special cause (assignable) variation and approximations between the computer simulation and the actual tools and processes, the actual parts may not be identical to the simulated part. Therefore, it has to be shown that the manufactured set of tools along with the prescribed process parameters can produce the desired part to the desired quality during try-out or be modified to do so. Further, as the actual tools are deployed at the production site, the stamping process has to be calibrated and monitored in order to assure the desired quality.

Currently, simulation results are typically only used little, or not at all for reference and consultation during tryouts and production. Wang, C. T., Zhang, J. J., Goan, N., in Draw-in Map—A Road Map for Simulation-Guided Die Tryout and Stamping Process Control, Numisheet 2005 and U.S. Pat. No. 7,130,708 B2 describe a process where a so-called engineered metal draw-in map is used in the tryout phase. In FIG. 2, draw-in 4 is the displacement of the sheet metal blank outline 5 to the formed part outline 6 during the deformation of the blank. The draw-in 4 is related to the distribution of flange material 8 between the formed part outline 6 and the punch opening line 7. When used during tryouts, given the blank size and position, tool geometries and process parameters match those prescribed by the simulation, it is attempted to rework the tools in order to match the simulation prescribed draw-in at certain positions. Typically, tryout workers resort to adjusting the restraining force of the draw beads.

Despite the indisputable progress in design and improvement in the quality of formed products, important issues are not being addressed:
1. When using draw-in maps during tryout, it is not possible to determine how to adjust process parameters in order to achieve the desired draw-in from the simulation. The adjustment for the different parameters is determined empirically by varying them using a best-guess method. This trial and error procedure is costly and time consuming.
2. During production, as opposed to the tryout phase, the actual draw-in is not monitored and compared against the simulated one. Process parameters, stress, strain, thickness distributions or other important quality and process control measures are also difficult to acquire and often neglected. A process can drift out of control without noticing and defective parts can end up in the assembly line.

Accordingly, a need exists for a methodology to determine the process parameters and state variables for a part and potential modifications to the process parameters in order to achieve the desired state variables.

The following references are related to this problem, but do not provide an adequate solution:

*Optimization of draw-in for an automotive sheet metal part An evaluation using surrogate models and response surfaces*; T. Jansson, A. Andersson, L. Nilsson; *Journal of Materials Processing Technology* 159 (2005) 426-434: Aan optimization of the draw-in of an automotive sheet metal part is presented, using response surface methodology (RSM) and space mapping technique. The optimization adjusts the draw bead restraining force in the model such that the draw-in in a Finite Element (FE) model corresponds to the draw-in in the physical process. The paper is directed to understanding of draw bead mechanics and to the improvement of simulation of the effects of draw bead geometry. For comparing simulation results with measurements from actual forming operations, draw-in is measured at a limited number of points along the part circumference. An optimisation is performed to find the set of draw bead parameters that minimizes the sum of differences between the measured and the simulated draw-in. The paper concludes that it was not possible to reach a perfect match between the optimised restraining force and the actual restraining force in the tool with this method. This is attributed to the discrepancy in measurements of the draw beads or the draw-in, differences in measuring the draw-in in reality and simulations and variations in material properties and friction properties. The method cannot be used for quality control during production.

*Sheet metal forming global control system based on artificial vision system and force acoustic sensors*; P. Fillatreau et al.; *Robotics and Computer-Integrated Manufactur-*

*ing* 24 (2008) 780-787, describes a multi sensor approach, incorporating artificial vision. The system is customised to analyse a particular type of part, at a rate of 2 parts per second. This control system combines fuzzy logic and expert system techniques, giving the operator of the machine feedback and advice on possible errors and advice on how to correct them. To do that, it is assumed that after getting the correct process setup and at the beginning of the production, parts are defect-free. During this phase, signals are recorded and an upper and lower envelope curves are determined that distinguish good parts from defect parts. The system is then trained to recognise when a signal is outside this envelope and in this case indicate a faulty part. The paper provides significant tools for the real time identification of defective parts as well as for the optical determination of shapes and geometries. It is nevertheless unclear how the measurements are linked to process parameters and, in effect, how the feedback control is achieved. Further, it is based on historical data and ignores natural process drift and variation that may not result in defective parts. It is not possible to identify particular defects, their location and severity. Finally it cannot be used during try-outs.

*Optical Measuring Technologies in Sheet Metal Processing*; K. Galanulis; *Advanced Materials Research Vols.* 6-8 (2005) pp 19-34, describes an optical system for the scanning of 3D surfaces, that is, for obtaining measurements of the location of surface points in 3D space. Based on measurements from a section of deformed sheet metal, strain, thickness reduction and local hardening may be calculated. From these, excessive strain and material faults can be determined.

*Contactless on-line measurement of material flow for closed loop control of deep drawing*; E Doege et al: *Journal of Materials Processing Technology* 130-131 (2002) 95-99: A new optical sensor for contactless online material flow measurement is presented. The sensor may be incorporated in a deep-drawing tool and observe material flow online during the forming process.

*Numerical Methods and Hardware Components for an Adaptive Robustness Control During the Production of Stamped Parts*; Manopulo et al, *Numisheet* 2008 pp. 871-876. A feasible way of using stochastic FE simulations along with eddy-current material testing in order to achieve online control of the scattering of material properties is presented. In a training step destructive and non-destructive tests are used to measure mechanical properties of batches of blanks. The stochastic simulation and these measurements are then used to create a mathematical model that can discriminate between blanks that will result in defects and blanks that should go to production. Alternatively, process parameters could be adjusted to account for the material properties. Manopulo et al attempt to prevent quality problems by assuming that the material properties are the main driver of defects. Their method applies to accepting and rejecting blanks during production, before the stamping process, employing a typical forward (input to output) usage of the stochastic simulation. It does not apply to tryout support. Most importantly it assumes that process parameters are perfectly controllable and identical through time and only material parameters determine the outcome of the process, which they do not consider at all.

*CAE tools as a valid opportunity to improve quality control systems performances for sheet metal formed components*; A. Del Prete et al.; *9$^{th}$ Biennal ASME Conf on Engineering Systems Design and Analysis ESDA*08 (2008) 329-334. Stochastic simulation of a deep drawing process is described. An example is given wherein the maximum binder force is computed by simulation, and its dependency on a number of design variables is presented. It is conjectured that the information from such a stochastic study would help to determine geometric features that have a high probability of drift and should therefore be monitored, e.g. by an optical scanner. The paper clearly recognizes the possibilities of the stochastic simulation as a source of information for the online quality control. However, the method cannot identify defects other than mismatches between CAD geometry and actual part. Further, it does not use the simulation to provide feedback about process conditions as there is no link between the process and the stochastic simulation. Finally, the method, if implemented, could have limited use in quality control as it cannot identify defects other than geometry divergence whereas excessive thinning and cracks, wrinkles and surface defects may be equally or more interesting. Finally it does not apply to tryout.

BRIEF SUMMARY OF THE INVENTION

It is therefore an object of the invention to create a method for characterizing a sheet metal part of the type mentioned initially, and a corresponding computer system, and a method for generating reference data for characterizing a sheet metal part, which overcome the disadvantages mentioned above.

The object of the invention is achieved by the methods and associated computer system and data storage devices according to the independent claims.

The present invention relates to a method and computer system for the characterization of a sheet metal part, the part being a sheet metal forming product. The method is based on the correlation of the distribution of excess material around the formed part or material flow into the tools to a priori calculated or measured data. The characterization comprises determining whether the particular product falls within the acceptable production limits in terms of quality, of determining areas of potential defects, types of potential defects, severity of potential defects, as well as approximating the process parameters prevailing during its production and how these should change in order to mitigate the defects. The characterization is performed in real-time during tool tryout, production ramp-up or production. The result of the characterization can be presented to the user or operator through a monitor or other devices such as a wearable monitor, or marked and/or displayed on the part itself. The approximation of the process parameters can be used to correct the process manually or automatically.

The present invention was made in view of the prior art described above and an object of the present invention is to provide a method to characterize an actual formed part in terms of state variables as well as to estimate the actual process parameters involved in its manufacturing.

The invention is based on the realization that quality and process information to identify a part as defective, a process as out of control, and measures on how to return to the desired state, exists in a properly conducted stochastic simulation.

An evaluation of process parameters and state variables corresponding to the actual formed part can then be used to accept or reject the part and adjust the process and tools if the part is not acceptable either during tryouts or production.

A method is provided to calculate process parameters and state variables for an actual part using results from a multitude of simulated or virtual parts for which both process parameters and state variables are known. These simulated parts can originate from a stochastic simulation or other technique. In order to establish a link between the actual part and the multitude of simulated parts, a metric is defined that can be measured or calculated for both. Such metrics, henceforth also called material flow metrics, typically represented by a distribution of a value along the boundary or the body of the part, include the distribution of the flange material or its complementary distribution of draw-in displacement, preferably around the entire circumference of the part, or along an appropriate section of the circumference. The material flow may, in a preferred embodiment of the invention, also comprise inner flanges, that is, flanges around the circumference of holes or other openings shaped in the part. Alternative or additional material flow metrics can be calculated at any section of the part or from traces such as skid lines or using other methods such as measuring the deformation of an etched grid or other marks on the part.

Simulation parameters preferably considered are process parameters or metal forming parameters, such as lubrication, tool forces, blank holder forces, forming speed, etc., and also blank parameters, such as the shape of the sheet metal blank, its thickness, material characteristics, rolling direction, etc. Further simulation parameters that, in a further preferred embodiment of the invention, also are considered to comprise the tool geometry, that is, the shape of punch, die and blank holder. It is not necessary that the complete geometry of the tools is variable at this stage of the process, it may rather be sufficient and desirable that only some parameters, like e.g. radii, draw beads, tool inlays, polishing, etc. are variable. Some simulation parameters may be controllable ("design parameters"), others may be considered to be disturbances ("noise parameters").

The simulation results, denoted as forming operation result data, preferably comprise one or more of the geometry, i.e. the shape or material distribution of the sheet metal part after the forming operation, and state variables of the sheet metal after the forming operation (optionally also during the forming operation). The state variables may comprise elongations or stresses in the formed material, the distribution of fracturing criteria, the displacement distribution as a result of resilience or spring-back after the removal from the tool, etc.

The method is useful for guiding tool tryouts towards achieving acceptable part quality. Further, it is useful during production to assist quality control, as it provides the capability to identify defects on each part as well as feedback to operators or equipment in order to return a process that drifts away from acceptable limits back under control.

In one embodiment, the method is divided in a preparation and an online phase. In the preparation phase the input to the method is a set of numerical simulations. One or more material flow metrics such as draw-in and flange distributions are calculated for each individual simulation. For example, these can be the distances between the outline of the blank and the outline of the formed part, or the distances between the outline of the formed part and the punch opening line. In a further preferred embodiment of the invention, the 3D geometry of the flange (that is, including its thickness and shape) between the outline of the formed part and the punch opening line can be considered as the material flow metric. Towards the determination of the material flow metric, in all cases, other lines than the punch opening line can be used, for example draw bead lines. The criterion for choosing a set of lines for calculating the material flow metric is that the resulting metric provides one-to-one correspondence between the material flow and the simulation parameters and distributions of state variables. One or more of such material flow metrics, along with the simulation parameters and the distribution of state variables for each virtual part are stored in a database.

In order to facilitate the online use of the system, it is useful to calculate classes within the material flow metric. Classes can be extracted using methods such as the principal components analysis, further clustering methods or other methods that identify patterns within a population. The use of classes improves the online performance of the system, by matching the actual distribution first to a class and then to an individual simulation within that class. Alternatively or in addition, mapping functions are established between the material flow metric and the process parameters and state variables. These are surrogate models that can be represented by either a set of global mapping functions for the whole set of simulations or a class-specific set of mapping functions for each individual class. These functions are also stored for later use.

In the online phase of the method, a digital representation of the geometry of actual part is measured, input to a computer, and the corresponding material flow metric is calculated. In a preferred embodiment of the invention, this distribution is then identified within the classes of distributions and either the closest match is retrieved, or it is inferred by means of the mapping functions of that class. The result is a forming operation data set with, e.g., a set of process parameters and state variables for the actual part. Comparing the distribution of state variables to the desired ones, defect areas can also be identified.

The result of the method can be used during tool try-outs, process adjustment (ramp-up) and monitoring (production). During tryouts, the engineers and operators get an approximation of the divergence of the actual process parameters and tool geometries from the desired ones. They can then adjust the process parameters and tool geometries accordingly. For example, if the draw beads restraining force is varied during a stochastic simulation, the method identifies the draw bead combinations that have to be adjusted, as well as how much they have to be adjusted, in order to depart from the current draw-in and approach the desired one. During production, the method offers a real-time and online quality measure. For example, using the thickness distribution resulting from the method, the operator might mark areas with critical thickness on the actual part. Finally, long term information of the quality of the parts produced and the variation of the process can be collected and summarized in process control charts and compared to the predicted/expected process capabilities which are essential for the statistical process control of the production.

The material flow metric for the actual part can be measured in many ways, from manual measurements, to scanning, to photogrammetry. In practice, during tryouts, the draw-in is measured by scribing the outline of the blank before (possibly after binder wrap) and after forming on the lower binder, and measuring the distance between the two lines. Plotting the draw-in at several locations along the outline corresponds to the draw-in distribution. For the invention to be useful for real-time, online quality control, a contactless and fast method is most desirable. An easy and effective way to do this is by means of a photographic camera placed above the formed part right after the end of the forming process and typically before any other operation takes place that would affect the shape of the flange, such as cutting. The photographic camera provides an image of the part. To measure the flange distribution as a material flow metric, both the part outline and the punch opening line are extracted from that image. The flange distribution can be represented, for example, by the distance between the part outline and the punch opening line (plotted along the part outline). Markers may be embossed or printed on the blank, and from their position and/or shape after forming other metrics such as strains, thickness and further properties may be measured or calculated. If a 3D-scanner or other high-resolution method is used, a more detailed description of the material flow metric can be acquired and potentially other variables such as the thickness can be measured directly.

A computer system for determining reference data for characterizing a sheet metal part comprises a digital computer with an internal memory, the memory comprising computer program code to make, when this computer program code is executed, the computer execute the method for determining reference data. In a further embodiment of the invention, this computer program code is stored on a computer readable medium.

In an embodiment, a computer system for characterizing a sheet metal part comprises a sensing device or other input device and a data processor, the computer system being configured and programmed to execute the method for characterizing a sheet metal part. The sensing device is preferably arranged to measure physical dimensions of a flange area or material flow of a sheet metal part before, during and/or after a forming operation in the course of tool tryout or online in the course of the manufacturing process of the part. In another embodiment and in particular during tool tryouts, the sensing device can be an instrument used for manual measurements.

Further preferred embodiments are evident from the dependent patent claims. Features of the method claims may be combined with features of the system claims and vice versa.

BRIEF DESCRIPTION OF THE DRAWINGS

The subject matter of the invention will be explained in more detail in the following text with reference to preferred exemplary embodiments which are illustrated in the attached schematic drawings, in which.

The reference symbols used in the drawings, and their meanings, are listed in summary form in the list of reference symbols. In principle, identical parts are provided with the same reference symbols in the figures.

DETAILED DESCRIPTION OF EMBODIMENTS

In a preferred embodiment of the invention, a method is used to calculate material flow (for example draw-in and flange distributions) for a set of simulations, identify patterns within the distributions, calculate mappings between draw-in or flange distributions and process parameters and state variables. Further steps are to acquire a digital model of an actual formed part, extract required information to calculate the material flow distribution for the actual part and infer the actual distribution to the virtual distributions. These steps are preferentially implemented by a computer program which is executed on a data processing system. The computer program may have two parts, one for preparing data and one that works online. This separation is not mandatory, but improves the online efficiency. From the inference it is possible to extract the characterisation of the part in terms of state variables and process parameters. This characterisation is, in a further step, used to modify process parameters during tryout and production in order to achieve the desired part characteristics and determine potential defects on the part.

Figure 4:
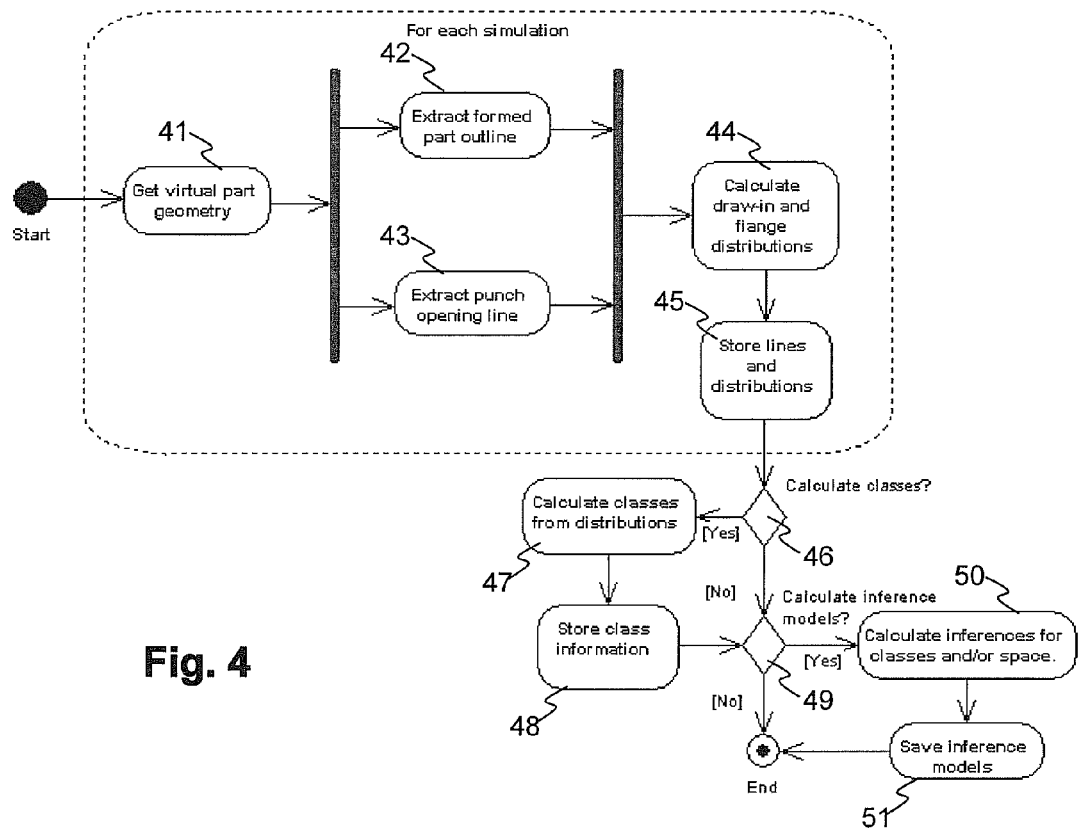
FIG. 4 presents a flowchart for extracting draw-in and flange distribution information from a set of simulations and calculating classes and inference models from these distributions.

FIG. 4 schematically illustrates the control flow of the preparatory phase of the method in a preferred embodiment of the invention. The method assumes that a material flow metric is selected and, in line with the requirements of this metric, there is a set of characteristic lines that can be used to calculate said metric. In the following the part outline and the punch opening line are considered to provide the draw-in or flange distribution, as one possible material flow metric, but other lines can be used as appropriate for the particular part. A prerequisite to the method is a multitude of simulation results, based on differing simulation parameters 21, where for each one there exists a set of initial parameters, a geometrical representation of the virtual formed part and state variables such as the thickness of the material of the formed part (forming operation result data 24). For each such simulation a pre-processor reads the virtual formed part geometry 41 and extracts the formed part outline 42 and the punch opening line 43. Given those two lines, the flange distribution is calculated 44. If the initial blank outline exists, the draw-in can also be calculated. The calculated lines and distributions are stored 45 as simulated material flow metrics 26 for later use.

Figure 1:
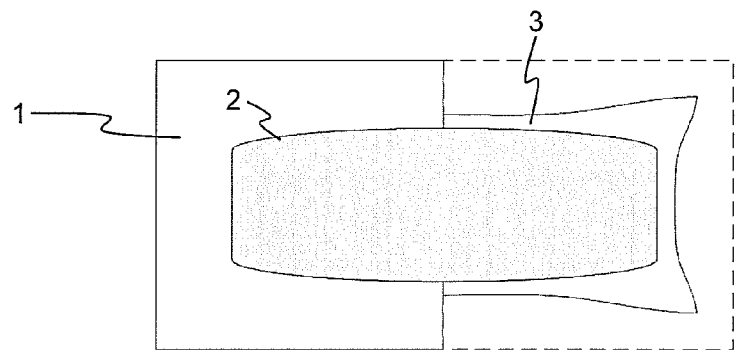
FIG. 1 is a top view of a simplified forming process where the left part of the drawing corresponds to the punch and sheet before forming and the right part of the drawing to the punch and sheet after drawing.
Figure 2:
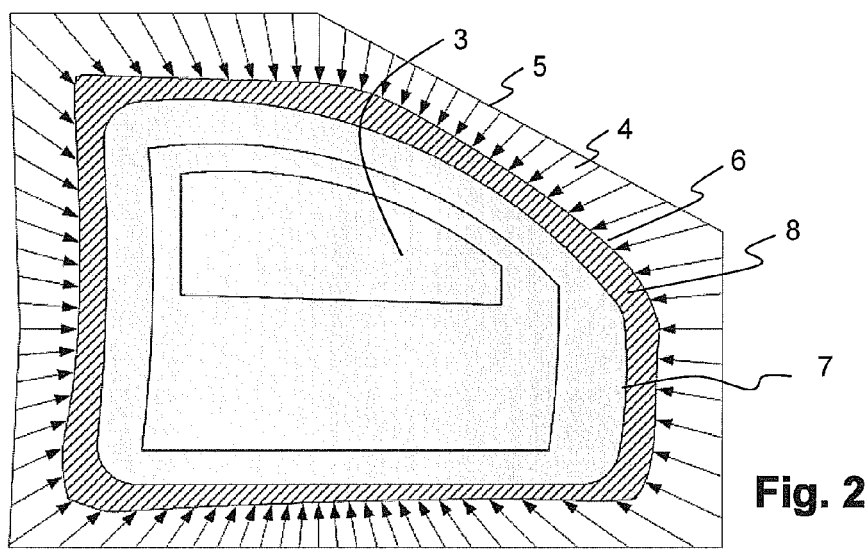
FIG. 2 is a top view of a formed metal part where the draw-in and the flange can be seen.
Figure 3:
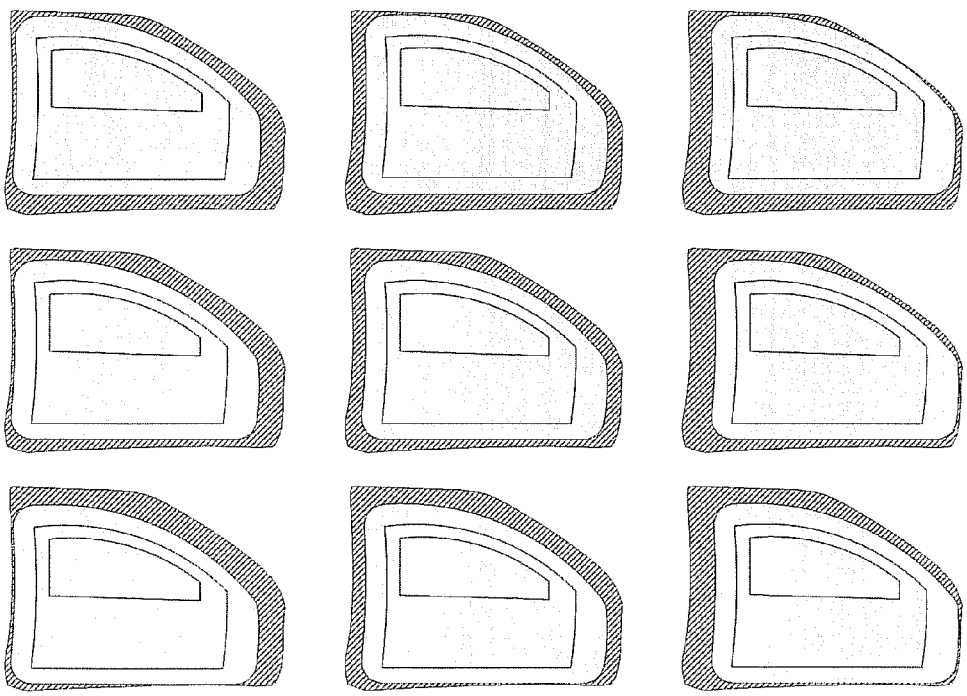
FIG. 3 shows possible alternatives of the flange distribution under varying process conditions.

If classes are to be calculated 46, the calculated set of draw-in or flange distributions is analysed 47 using a classifying or pattern recognition method and the resulting class information is saved as class definition data 30 in the database 48. An example of classes within the draw-in is presented in FIG. 3.

In order to extract useful patterns from the pool of stored material flow metrics (draw-in or whole sheet or other), one may assume without loss of generality that the distributions lie in the same multidimensional space. Techniques for pattern extraction and classification are known in the field of pattern recognition and can range from Bayesian networks to neural networks to linear or quadratic classifiers etc. A combination of techniques may be used to achieve the desired result. Some of the relevant techniques are:

Principal component analysis, which can be used to identify the dominant modes in a set of patterns, their energies and which mode contributes to which pattern. Such a technique can be used to filter out perturbations and yield a handful of dominant patterns from hundreds of simulated material flow metrics.

Linear discriminant analysis and the related Fischer's linear discriminant, which can be used to identify more directly the linear combination of features which separate two or more classes, but then the classes must be known in advance.

Cluster analysis.

In principle, if the number of classes is known, any pattern recognition technique can give a result. Principal components analysis is a good way to start with in order to determine the number and shape of classes. A classification algorithm can take advantage of other traits of the problem in order to identify interesting classes, such as the fact that usually larger deformations occur along the sides of the blank. Obviously, as the blank has a finite number of sides, combinations of side deformations may constitute a finite number of interesting classes of material flow metrics.

Either for each one of the classes or for the whole population of material flow metrics 49, mapping functions or matching functions that define a relationship for mapping between material flow metrics and forming operation data sets 27 comprising e.g. process parameters and state variables are calculated 50 using statistical or other methods. The functions are saved 51 as mapping or matching information 31 in the database which concludes the preparatory phase of the computer program. Such mapping information may also be considered to be a surrogate model relating material flow metrics and forming operation data sets.

Figure 5:
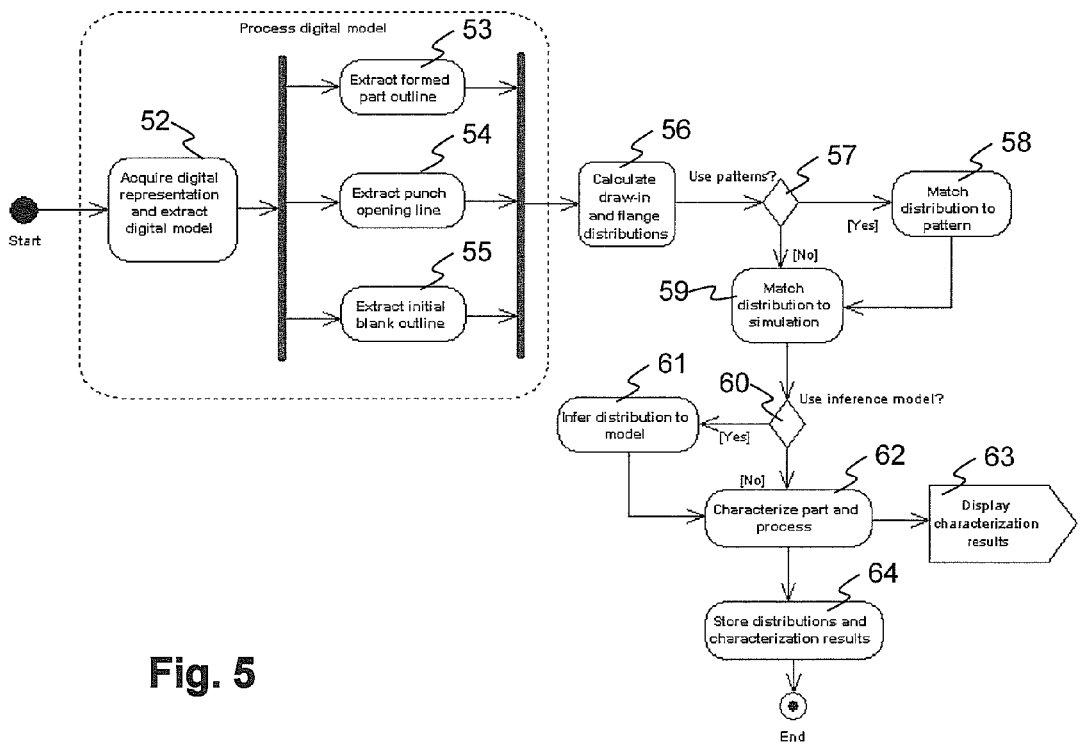
FIG. 5 presents a flowchart for extracting draw-in and flange distribution information from a digital model of an actual formed part and classifying it using the saved classes and inference models.

FIG. 5 schematically illustrates the control flow of the real-time or online phase of the method in a preferred embodiment of the invention. By means of a sensing device 11, using manual measurements, an optical, scanning or other method, a digital two-dimensional or three-dimensional geometrical digital model 12 of the actual formed part 10 is acquired 52 that, depending on the calculation requirements for the material flow metric, may include one or more configurations of the actual formed part 10 before (i.e. the blank 3), during and/or after the forming operation. From this digital model 12 of the formed part, measured material flow metrics 14 such as e.g. the formed part outline 53 and the punch opening line 54 are extracted by a feature extractor 13. If there is information on the initial position of the sheet metal blank before the process, the initial blank outline 55 is extracted as well. The extracted lines are used to calculate the actual flange and draw-in distributions 56. If there are saved distribution patterns 57, as part of reference data 33, these are retrieved from the database and the actual distribution in question is matched to a pattern 58 by a matching unit 15. The distribution is then matched to an individual simulation 59, either within the pattern or within the whole population. If inference or mapping functions have been calculated 60, these are used to infer or to interpolate the distribution in question 61 to the functions.

Inference models for mapping material flows to forming operation data can be developed using different techniques and depending on what the outcome might be. A neural network, for example, a simple feed forward with back propagation network, or a radial basis function (RBF) network can provide a mapping of a multidimensional input (in this case, the material flow metric) to a multidimensional output (in this case, forming operation data). Response surface and Kriging techniques can also be used. Bayesian networks can equally well be used to calculate the probability that some zones of the formed part may show particular quality problems.

Either through matching or inference, the distribution is used to characterize the part 62, determining a matching forming operation data set 16 that characterizes the part. The characterization consists of process parameters and state variables for the actual part and mapping them from the original geometries to the actual geometry. The characterisation can also include additional quality control metrics, statistical information or any form of advisory data for the operator or digital feedback for the closed control loop of the equipment. Comparing the calculated state variables to the desired ones, areas of potential defects can be identified on the actual part 10. The characterization result is then displayed to the user 63 on a display device 17, for example by overlaying a colour coded representation of chosen state variables, parameters and/or fault probabilities on a 2D- or 3D model of the part. It is also possible to overlay the colour coded representation to a video image of the real part displayed either on a display device or in a wearable display system, thus allowing the user to identify and mark areas of potential quality problems for further inspection. In another embodiment, the affected area on the part is marked with spray or a marker, e.g. by a robotic device, or a barcode, RFID or other machine or human readable representation of data is attached to the part to make it possible to identify it in later inspection. Finally, the characterization result is saved in the database 64.

Figure 6:
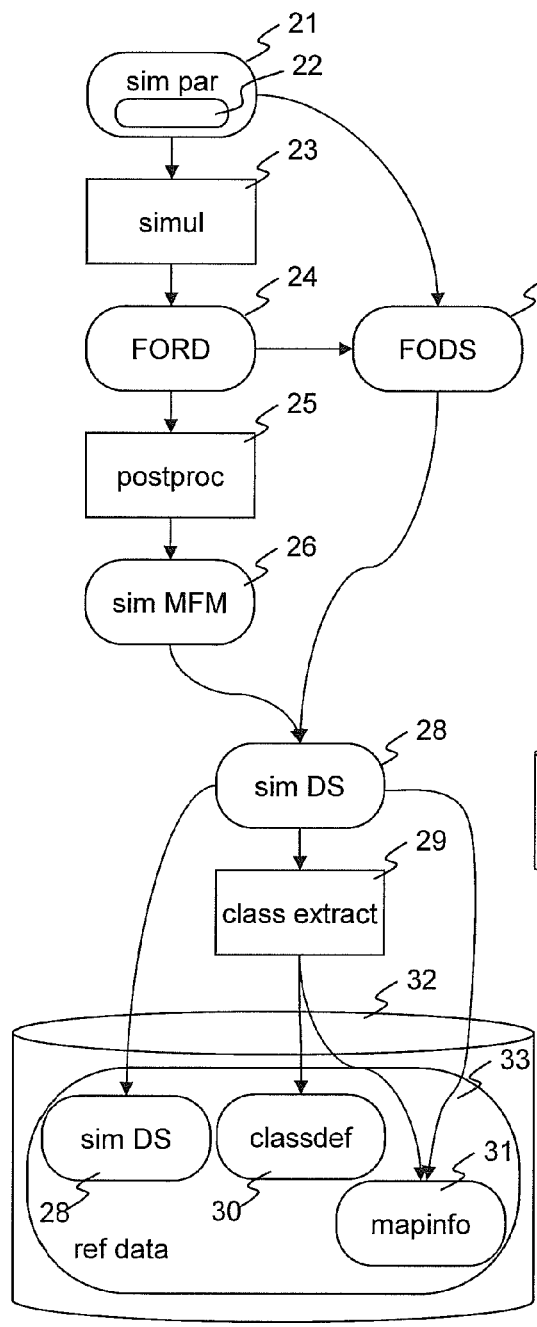
FIG. 6 shows the structure of a system for determining reference data and inference models for characterizing a sheet metal part.

FIG. 6 shows the structure of a system for determining reference data 33 for characterizing a sheet metal part, and also the data flow of a corresponding method. The system starts out with a set of simulation parameters 21, the simulation parameters 21 defining at least a tool geometry and process parameters 22 of a forming operation performed on the sheet metal part. A numerical simulator 23 is configured to simulate execution of the forming operation on the sheet metal part, the forming operation being characterised by the simulation parameters 21. By the simulation, the numerical simulator 23 computes forming operation result data (FORD) 24 comprising at least the geometry (that is, the 3D- or a 2D shape) of the simulated sheet metal part 3 after the forming operation. From this geometry, a postprocessor 25 computes a simulated material flow metric (sim MFM) 26. The simulated material flow metric 26 is representative of or related to the geometry of the flange area 8 of the simulated sheet metal part 3 after the forming operation, the flange area being the area between the edge of the metal sheet after forming and a predefined characteristic line such as the punch opening line. The simulated material flow metric 26 is, for example, a data set representing the draw-in or the flange distribution for the simulated part.

The simulated material flow metric 26 is associated with a forming operation data set 27 (FODS) used in the generation of the material flow metric 26, and both are stored, in a computer readable storage medium. The forming operation data set 27 comprises at least one of the process parameters 22 and the forming operation result data 24. Through this association, it shall later be possible to determine forming operation data, given a measured material flow metric.

The preceding steps are repeated several times with different simulation parameters 21. For each simulation, the forming operation data set 27 and the associated simulated material flow metric 26 is stored in a computer readable data storage device 32. The entirety (that is, over all simulations) of forming operation data sets 27 and associated simulated material flow metrics 26 shall be labelled a simulation data set 28 (sim DS). In other words, the simulation data set 28 comprises a plurality of forming operation data sets 27 and associated simulated material flow metrics 26.

In principle, the information contained in this simulation data set 28 is sufficient to determine forming operation data, given a measured material flow metric. In order to facilitate and speed up the later online matching of measured material flow metrics and the retrieval of corresponding forming operation data, in a preferred embodiment of the invention, a class extractor 29 is configured to analyse the material flow metrics generated by the several simulations and to identify a plurality of classes within these simulated material flow metrics 26. Resulting reference data 33 for characterizing the sheet metal part comprises class definition data 30 (classdef) defining these classes, and mapping information 31 (mapinfo). In order to evaluate more precise FODS for the meas MFM, it is possible to use a surrogate model. This surrogate model, represented by the mapping information 31 defines the parameters of one or more mapping functions that constitute a mapping from material flow metrics to forming operation data sets, with either a single set of mapping functions being defined globally over all material flow metrics, or one set of local mapping functions for each class, being defined over the material flow metrics of that class. The reference data 33 is stored in a computer readable data storage device 32 for further use in the online characterisation of the sheet metal part.

Figure 7:
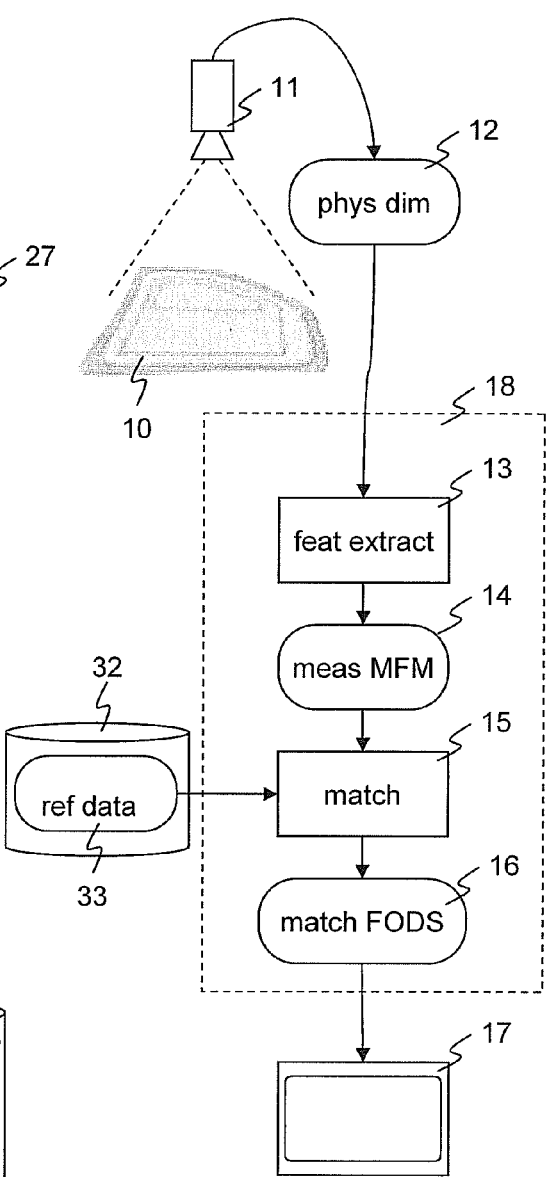
FIG. 7 shows the structure of a system for characterizing a sheet metal part.

FIG. 7 shows the structure of a system for characterizing a sheet metal part, and also the data flow of a corresponding method. A sensing device 11 is arranged to measure physical dimensions 12 of the flange area of an actual sheet metal part 10 after a forming operation. The sensing device 11 is, for example, a camera or a 3D scanner or other contact-based or contactless measurement system, or a sensor incorporated in the deep drawing tool, as described e.g. in the initially mentioned publication by E. Doege et al, but can be as simple as a device used for taking manual measurements. Manual measurements may involve, for example, touch probes, chalk marks on sheet, a string to measure the length of lines or distances from draw beads, etc. The following steps are executed on a data processor 18, which may comprise, for example, dedicated hardware and/or a general-purpose computer or cluster of computers programmed to perform the method steps of feature extraction and matching, as described in the following:

- A feature extractor 13 computes a measured material flow metric 14, the measured material flow metric 14 (meas MFM) being representative of the geometry of a flange area 8 of the actual sheet metal part 10 after the forming operation. Reference data 33 is retrieved from a computer readable data storage device 32, the reference data 33 comprising at least one of a simulation data set 28 and class definition data 30 and mapping information 31.
- A matching unit 15 determines, from the reference data 33 and the measured material flow metric 14, a matching forming operation data set 16 (match FODS) whose associated simulated material flow metric 26 most closely matches the measured material flow metric 14. "Most closely" in this context is defined, for example, in terms of proximity to or inference from the simulated material flow metrics 26.
- A display device 17 is configured to display a visual representation of selected information, characterizing the actual sheet metal part 10, from the matching forming operation data set 16. This information is one of, for example, one or more process parameters, state variables and areas of defects of the part after forming.

In one exemplary embodiment of the invention, the matching performed by the matching unit 15 can be limited to simply identifying the simulation data set 28 for which the corresponding simulated material flow metric 26 is closest to the measured material flow metric 14. The proximity can be expressed using different metrics, but to illustrate this process, a simple criterion is the minimum angle between the vectors of the simulated material flow metric 26 and the measured material flow metric 14. Both quantities can be represented as vectors of real numbers and have the same dimensionality since the sampling points are the same; therefore the angle between these vectors is trivial to calculate.

A more elaborate evaluation of the matching forming operation data set 16 can involve the calculated mapping information 31. In this case, the set of one or more mapping functions is used to calculate the matching forming operation data set 16 from the measured material flow metric 14. The result can offer a more precise matching forming operation data set 16 than the simple matching, since, in the latter case, two slightly different measured material flow metrics 14 might be matched to the same matching forming operation data set 16. However, the result is dependent on the assumptions implicit in the surrogate model used for the calculation of the mapping information 31.

In addition to the previous techniques for evaluating the matching forming operation data set 16, and in order to accelerate this process during the online use of the computer system, calculated class definition data 30 classes can be used. The evaluation can be done, in the same way as described so far, but—instead of using all the simulated material flow metric 26—by first matching the measured material flow metric 14 to a class in class definition data 30 and then to one of the simulated material flow metrics 26 in that class. If for that class a mapping information 31 exists, this can be used to determine a more precise evaluation of a matching forming operation data set 16. The use of the classes accelerates the process in way of locating the measured material flow metric 14 to a subspace of the whole design space, so smaller surrogate models can be used but also in way of acting as a filter, where measured material flow metrics 14 that correspond to defect-free subspaces of the design space do not need further processing, at least not during the on-line phase.

The invention is obviously not limited to the preferred embodiments described above by way of an example, but lends itself to modifications within the scope of the invention as defined in the claims below.

LIST OF DESIGNATIONS 1 blank
2 forming tool
3 formed part
4 draw-in
5 sheet metal blank outline
6 formed part outline
7 punch opening line
8 flange material, flange area
10 actual sheet metal part
11 sensing device
12 physical dimensions
13 feature extractor
14 measured material flow metric
15 matching unit
16 matching forming operation data set
17 display device
18 data processor
21 simulation parameters 22 process parameters
23 numerical simulator
24 forming operation result data
25 postprocessor
26 simulated material flow metric
27 forming operation data set
28 simulation data set
29 class extractor
30 class definition data
31 mapping information
32 data storage device
33 reference data

The invention claimed is:

1. A method for characterizing a sheet metal part, the method comprising the steps of:
   a sensing operation providing physical dimensions of an actual sheet metal part before, during and/or after a forming operation;
   a feature extractor computing, from these physical dimensions, a measured material flow metric, the measured material flow metric being representative of a geometry of the actual sheet metal part after the forming operation;
   retrieving, from a computer readable data storage device, reference data that represents the results of a set of simulations of the forming operation, each simulation being associated with a forming operation data set that characterizes the simulation, and a simulated material flow metric that is a result of the simulation;
   a matching unit determining, from the reference data and the measured material flow metric, a matching forming operation data set whose associated simulated material flow metric most closely matches the measured material flow metric and
   outputting, on a display device or on the actual sheet metal part, a visual representation of data of the matching forming operation data set or putting a human or machine readable marking on the actual sheet metal part representative of the forming operation data set.

2. The method of claim 1, wherein the reference data comprises at least one of a simulation data set and class definition data and mapping information; wherein
   the simulation data set comprises a plurality of forming operation data sets and associated simulated material flow metrics, the forming operation data sets comprising at least one of: process parameters of the forming operation, forming operation result data and a geometry of a simulated sheet metal part, and the simulated material flow metric being representative of the geometry of a flange area of the simulated sheet metal part after the forming operation; and
   the class definition data defines classes within the simulated material flow metrics;
   the mapping information defines one or more mapping functions, defining a mapping from material flow metrics to forming operation data sets, with either a set of one or more mapping functions being defined globally over all material flow metrics, or a set of one or more local mapping functions for each class, being defined over the material flow metrics corresponding to that class.

3. The method of claim 1, wherein the matching forming operation data set comprises at least one of:
   process parameters of the forming operation;
   the geometry of the simulated sheet metal part after the forming operation;
   state variables of the simulated sheet metal part after the forming operation;
   areas of defects of the part shaped by the forming process; and
   qualitative or quantitative information on how to change the process parameters of a forming operation in order to achieve a desired process performance.

4. The method of claim 1, wherein the matching unit performs the steps of:
   given the measured material flow metric, determining a class into which this measured material flow metric falls;
   returning, as matching forming operation data set, one of the forming operation data sets with this class.

5. The method of claim 1, wherein the matching unit performs the step of:
   returning, as matching forming operation data set, a matching forming operation data set inferred from the measured material flow metric by means of a mapping function.

6. The method of claim 1, wherein the measured material flow metric and the simulated material flow metrics are either flange or a draw-in distribution or a combination of both.

7. The method of claim 1, comprising providing a data storage device comprising stored non-transitory computer program code which, when executed performs the sensing, the computing, the retrieving, and the matching.

8. The method of claim 1, comprising providing a computer system for characterizing the sheet metal part, the computer system comprising a data processor, the computer system being configured and programmed to execute the sensing, the computing, the retrieving, and the matching.

9. The method of claim 8, comprising providing a sensing device arranged to provide physical dimensions of the actual sheet metal part after the forming operation.

10. A method for generating reference data for characterizing a sheet metal part, the method comprising the steps of:
    a) providing forming operation result data, the forming operation result data comprising at least a geometry of a simulated sheet metal part after the forming operation;
    b) a postprocessor computing, from a forming operation result data, a simulated material flow metric, the simulated material flow metric being representative of the geometry of the simulated sheet metal part after the forming operation;
    c) storing, in a non-transitory computer readable storage medium, the simulated material flow metric and a forming operation data set, the forming operation data set comprising at least one of the process parameters and the forming operation result data;
    d) repeating the preceding steps several times with different forming operation result data and storing, in a computer readable data storage device, in each case the forming operation data set and the associated simulated material flow metric, the entirety of forming operation data sets and associated simulated material flow metrics constituting a simulation data set;
    e) computing and storing, in the computer readable data storage device, mapping information that defines a relationship between material flow metrics and forming operation data sets and
    outputting, on a display device or on an actual sheet metal part, a visual representation of data of at least one of the forming operation data sets or putting a human or machine readable marking on the actual sheet metal part representative of at least one of the forming operation data sets.

11. The method of claim 10, wherein the step of providing forming operation result data comprises the steps of:
f) providing a set of simulation parameters, the simulation parameters defining at least process parameters of the forming operation performed on the sheet metal part;
g) a numerical simulator simulating execution of the forming operation on the sheet metal part, the forming operation being characterized by the simulation parameters, and the numerical simulator thereby computing the forming operation result data;
wherein the repeating of step a) for providing forming operation result data is done using different sets of simulations parameters.

12. The method of claim 10, comprising the further steps of:
h) a class extractor analysing the material flow metrics generated by the several simulations and identifying a plurality of classes within these simulated material flow metrics; and
i) storing, in the computer readable data storage device, class definition data defining these classes, wherein the mapping information associates one or more simulation data set with each class, for further use as reference data for characterizing the sheet metal part.

13. The method of one of claim 10, wherein
the mapping information defines one or more mapping functions, defining a mapping from material flow metrics to forming operation data sets, with either a set of one or more mapping functions being defined globally over all material flow metrics, or a set of one or more local mapping functions for each class of a plurality of classes within the material flow metrics, the local mapping function being defined over the material flow metrics corresponding to that class.

14. The method of claim 10, comprising providing a data storage device comprising stored non-transitory computer program code which, when executed on a computer system, performs the providing, the computing, the storing, and the repeating.

* * * * *